No. 12,658. REISSUED JUNE 4, 1907.

P. L. T. HÉROULT.

ELECTRIC FURNACE AND PROCESS.

APPLICATION FILED SEPT. 16, 1905.

WITNESSES:

Fred White

René Pruine

INVENTOR:

Paul Louis Toussaint Héroult,

By Attorneys,

Arthur C. Fraser & Co.

UNITED STATES PATENT OFFICE.

PAUL LOUIS TOUSSAINT HÉROULT, OF LA PRAZ, FRANCE, ASSIGNOR TO STÉ. ELECTRO METALLURGIQUE FRANCAISE, OF FROGES, ISÈRE, FRANCE.

ELECTRIC FURNACE AND PROCESS.

No. 12,658. Specification of Reissued Letters Patent. Reissued June 4, 1907.

Original No. 721,703, dated March 3, 1903. Application for reissue filed September 16, 1906. Serial No. 278,794.

*To all whom it may concern:*

Be it known that I, PAUL LOUIS TOUSSAINT HÉROULT, a citizen of the Republic of France, and a resident of La Praz, Savoie, France, have invented certain new and useful Improvements in Electric Furnaces and Processes, of which the following is a specification.

The improvements to which this invention relates have been devised in order to obtain by the electric furnace soft metals, such as chromium, manganese, or iron, and generally substances which tend to combine with carbon. In order to avoid as much as possible all possible introduction into the material operated on of carbon from the electrodes instead of the single arc which usually heats an electric furnace, two separate arcs in series are, according to this invention, employed to play through the insulating layer of slag between the metal or the fused conducting material on the one hand and the two electrodes on the other hand. In order to insure the distinct formation of these two arcs, two accessory circuits are arranged, connecting outside the furnace each of the two electrodes to the fused material, and in each of these circuits there is introduced in shunt a voltmeter, the indications of which serve to constantly verify and regulate the position of both electrodes and to determine whether or not the furnace is operating properly. Thus either by hand or by automatic mechanism operated by the two shunt-currents each electrode can be raised or lowered to determine the arc, as desired. The outgoing conductor consists of a rod passing through the crucible-wall and projecting outside and inside of the same, so that the portion of the rod which is melted is replaced by molten material which fills up the space and insures good conductivity. When alternating currents are employed and the electrodes are arranged so as to consume equally, the position of both can be regulated at the same time by employing a single voltmeter between one of the electrodes and the metal.

Such is the principle of the invention which is carried out as will be described referring to the accompanying drawings.

Figure 1:
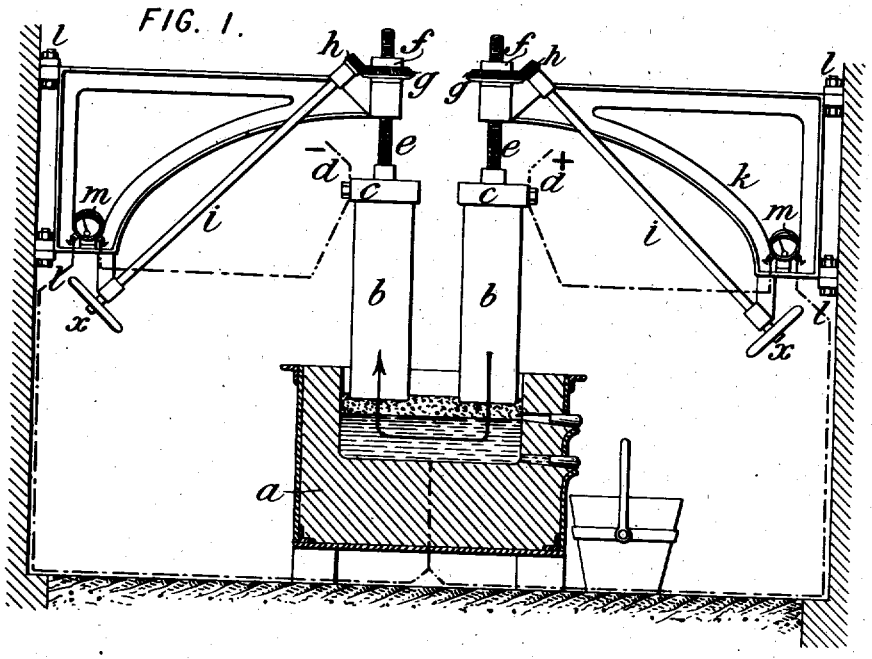
Figure 2:
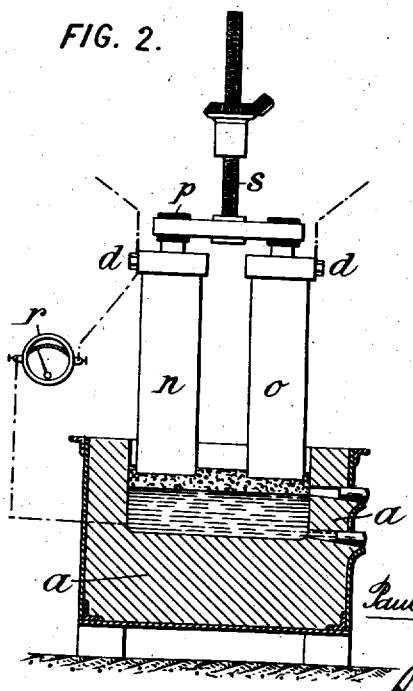

Figure 1 is an elevation, partly sectional, arranged as described in the first place for use with currents either continuous or alternating. Fig. 2 shows the same furnace adapted solely to alternating currents.

The crucible *a* is made of suitable refractory material—such as fire-brick, magnesia, dolomite, lime, silica, chromite, or the like—and it is inclosed in an iron casing. Such a crucible is usually provided with two tap-holes at different levels, the one for running out metal, the other for running out slag or the like. In the crucible is placed the material to be treated, above which the two electrodes *b b* are carried in sockets *c c* having current connections *d d* and long screw-threaded rods *e e*, which pass through nuts *f f*, consisting of the bosses of bevel-wheels *g g*, gearing with pinions *h h* on spindles *i i*, that can be turned by hand-wheels *x x*. Each of the electrodes and the parts belonging to it are carried by a cantaliver-frame *k*, which is hinged at *l*, so that it can be turned aside from over the furnace. A voltmeter *m* is introduced in shunt between each electrode and the molten metal, and these show how the operation proceeds, so that according to these indications the attendant can raise or lower either electrode, so as to regulate each of the arcs.

In Fig. 2 the two electrodes *n o* are shown to be carried by an insulated cross-head *p*, each having its current connection.

A voltmeter *r* is introduced in a shunt-circuit between one of the electrodes and the molten metal. This indicates variations of tension, so that the distance between the electrodes and the bath of metal can be varied, as required, by raising or lowering the screwed rod *s*, which carries the electrode and is worked in the same way as was described with reference to Fig. 1. Obviously such an arrangement could be employed with triphase or polyphase currents by providing more than two electrodes with the means described of regulating their positions.

The arrangement of the voltmeter between the electrodes and the molten material, while the electrodes themselves are in series with each other, serves to indicate at once and without the necessity of direct inspection the occurrence of a short circuit between the electrodes, an occurrence which would not only cut off the operation of the furnace, but would damage the electrodes.

The arrangement described is applicable not only to the reduction of ores, but also to the decarburization of substances treated with oxidizing slags or with air-blast, and it may be combined with any arrangement for using gases evolved from the reducing action in the crucible, so as to subject the substances to be treated to preliminary heating or reduction.

When the arrangement is applied to the manufacture of steel or melted iron, there is directly obtained in the crucible metal decarburized by the slag, and the reducing gases in passing through the soft ore between the electrodes so act that the ore is partly reduced before undergoing electrical fusion. Cast-iron can also be decarbureted or dephosphorated by the use of reagents according to the Thomas process.

The slag which forms the resisting medium in which the heat is produced may be of various compositions. For example, when the furnace is used for the production of metals the slag is mostly imperfectly-reduced mineral matter, or if the furnace be used to obtain stability of composition of mixtures of fine steel with other elements—such as chromium, nickel, tungsten, &c.—the slag is composed chiefly of reagents designed to act on the bath of metal—such as lime, dolomite, or oxid of iron liquefied by the addition of silica—or it may be substantially neutral, such as a fusible silicate which has no chemical action on the bath.

The voltmeter-terminal which communicates with the material in the crucible is preferably a rod of the same metal as that being produced in the crucible and is built into or passes through the refractory wall of the crucible into the material within the same. When the rod melts, the space or hole which it leaves in the wall is filled with molten conducting material, the extent of fusion of which is limited by the proximity of the cold exterior wall. As the current carried by this terminal is only a few milliamperes, this arrangement works very well.

I am aware that there are already in use electric furnaces having two electrodes of the Cowles kind; but in these furnaces, which are generally inclosed in non-conducting materials, it is only by accident that the main arc subdivides into several partial arcs. This may also happen in furnaces in which the arc plays on the treated substance or is blown upon it by a magnet. I am also aware that there are furnaces with multiple electrodes producing several arcs playing above the material treated and heating by radiation and not by passing through it.

I claim:—

1. In the manufacture of soft metals such as chromium, manganese or iron by means of an electric furnace, the method which consists in playing two separate arcs in series through an insulating layer of slag between the metal on the one hand, and the two carbon electrodes on the other hand.

2. In the manufacture of metals having a strong affinity for carbon, such as chromium, manganese, iron, or the like, by means of an electric furnace with carbon electrodes, the method which consists in submitting the charge to the heat of electric arcs between the electrodes and the metal itself, and regulating the arcs so as to avoid contact of the electrodes with the metal.

3. In the manufacture of metals having a strong affinity for carbon, such as chromium, manganese, iron, or the like, by means of an electric furnace with carbon electrodes, the method which consists in passing the current from one electrode into and through the metal, thence through another electrode, and regulating the position of each electrode separately, so as to avoid contact thereof with the metal.

4. In the manufacture of metals having a strong affinity for carbon, such as chromium, manganese, iron, or the like, by means of an electric furnace with carbon electrodes, the method which consists in maintaining a layer of non-conducting slag between the end of an electrode and the molten metal, so as to avoid the combining of the carbon of the electrode with the metal.

5. In an electric furnace, the combination of a crucible adapted to carry a bath of molten material, two electrodes supported above it and connected in series, a conductor in position to effect contact with material contained in the crucible and a voltmeter in shunt between one of said electrodes and said conductor, said conductor consisting of a rod passing through the refractory material of the crucible and projecting outside and inside of the same whereby the portion of the rod which is melted is replaced by molten material which fills up the space and thus insures good conductivity.

6. An apparatus for the manufacture of metals having a strong affinity for carbon, such as chromium, manganese, iron or the like, consisting of an electric furnace with carbon electrodes arranged to form arcs in series by passing the current from one electrode through an arc into and through the metal and then through another arc to another electrode, a voltmeter in shunt between each electrode and the metal in the furnace for indicating the length of each arc separately, and means for regulating the position of each electrode separately so as to avoid contact thereof with the metal.

In witness whereof, I have hereunto signed my name in the presence of two subscribing witnesses.

PAUL LOUIS TOUSSAINT HÉROULT.

Witnesses:

DOMINGO A. USINA,

THEODORE T. SNELL.